United States Patent [19]
Tkach et al.

[11] 3,946,804
[45] Mar. 30, 1976

[54] PLATE HEAT EXCHANGER

[76] Inventors: Grigory Anatolievich Tkach, ulitsa Frunze, 15, kv. 8; Vsevolod Dmitrievich Smolyak, ulitsa Sumskaya, 106, kv. 12; Vitaly Moiseevich Frumin, 605 mikroraion, 22, kv. 5; Anatoly Grigorievich Klimor, ulitsa Sumskaya, 100, kv. 9, all of Kharkov, U.S.S.R.

[22] Filed: Dec. 7, 1973

[21] Appl. No.: 422,921

[52] U.S. Cl................. 165/167; 159/16 R; 159/18; 159/28 P
[51] Int. Cl.².......................................... F28F 3/08
[58] Field of Search................... 165/167; 159/28 P; 202/236

[56] References Cited
UNITED STATES PATENTS

| | | | |
|---|---|---|---|
| 3,073,380 | 1/1963 | Palmason | 165/167 |
| 3,150,028 | 9/1964 | Wennerberg | 165/167 X |
| 3,155,565 | 11/1964 | Goodman | 165/167 |
| 3,371,709 | 3/1968 | Rosenblad | 159/28 P |
| 3,399,708 | 9/1968 | Usher et al. | 165/167 |
| 3,808,104 | 4/1974 | Davidson | 159/28 P |

*Primary Examiner*—Charles J. Myhre
*Assistant Examiner*—Theophil W. Streule, Jr.
*Attorney, Agent, or Firm*—Haseltine, Lake & Waters

[57] ABSTRACT

A plate heat exchanger generally for media liberating a gaseous agent from a liquid heat-transfer medium during heat-exchanging process characterized in that stacks of heat-exchanging plates are placed inside a housing, the interior of this housing being in communication with channels for passing a gaseous heat-transfer medium, whereas each of the heat-exchanging plates has partitions providing a required flow direction for the gaseous agent liberated from the liquid heat-transfer medium and contributing to its discharging from the zones of its liberation disposed at different height of the channel.

The heat exchanger is provided with a device for external passing of the liquid heat-transfer medium between the adjacent heat-exchanging sections 34 and 33 made as a vertical chamber 35 with bubbling elements 36 therein, a union 38 for additional introduction of the gaseous heat-transfer medium being placed in the lower portion of the chamber 35, while the upper portion thereof is provided with a union 40 for gas discharge.

The heat exchanger according to the invention can be effectively used for carrying out heat-exchange processes followed by liberation of a gaseous agent from the liquid heat-transfer medium instead of the pipe heat exchangers traditionally used in the art.

7 Claims, 7 Drawing Figures

PLATE HEAT EXCHANGER

The present invention relates generally to plate heat exchangers and, more particularly, to plate heat exchangers for those media which liberate a gaseous agent during heat-exchanging process.

Plate heat exchangers are well known and widely used in various industries and in the chemical industry in particular.

Conventional plate heat exchangers comprise stacked heat-exchanging plates forming alternate channels for passing a liquid heat-transfer medium and a gaseous heat-transfer medium. The liquid heat-transfer medium and the gaseous heat-transfer medium are introduced respectively into their associated channels through distributing manifolds handling liquid and gas or steam. Upon completion of the heat-exchanging process effected through the agency of the heat-exchanging plates, the liquid and gaseous heat-transfer media are discharged through respective manifolds.

An important advantage of plate heat exchangers with respect to tubular heat exchangers consists in higher specific velocities of heat-transfer media along with a high heat transfer coefficient.

However, this advantage of plate heat exchangers have not been up to now efficiently utilized in those liquid-to-gas heat exchanging processes which are accompanied by the liberation from the heat-transfer medium of a gaseous agent contained therein.

For example, during the process of heat exchange between the filter liquid used in ammonia soda process and comprising essentially aqueous solution containing $NH_4Cl$, $NaCl$, $(NH_4)_2 CO_3$, $NH_4HCO_3$ and a steam-gas mixture at the stage of distillation of the above filter liquid, the latter liquid liberates carbon dioxide during heating.

Attemps to utilize plate heat exchangers in this process for heating a filter liquid have brought no success because the gas liberated from the liquid takes the form of bubbles providing gas cushions hampering the liquid flow, increasing the pressure in the channel for passing the liquid heat-transfer medium and causing overheating of the heat-transfer surfaces, resulting in a sharp decrease of heat exchange efficiency.

It is an object of this invention to provide a plate heat exchanger of a design which makes it possible to efficiently use the heat exchanger with media liberating gaseous agent from a liquid heat-transfer medium during the heat transfer process.

It is a further object of the invention to provide a plate heat exchanger, wherein during liberation of a gaseous agent from a liquid heat-transfer medium, it would be possible to avoid forming gas cushions in the channels along which the liquid heat transfer medium passes, thereby providing free passing of the liquid and preventing a pressure rise as well as an overheating of the heat transfer surfaces in said channels.

It is another object of the invention to provide a plate heat exchanger of a design ensuring a high degree of distilling a gaseous agent off the liquid heat-transfer medium.

Still another object of the present invention is to intensify the heat exchange process under conditions of liberating a gaseous agent from the liquid heat-transfer medium.

It is a specific object of the present invention to provide a plate heat exchanger of design which makes it possible to use the heat exchanger in those liquid-to-gas heat exchange processes which are accompanied by liberation from a liquid heat-transfer medium of a gaseous agent contained therein.

According to the invention, these and other objects are achieved by the provision of a heat exchanger, wherein stacks of heat-exchanging plates are placed in a housing the interior of which is communicated with channels for passing a gaseous heat-transfer medium, while each plate at the side forming channel for passing the liquid heat-transfer medium is provided with a device for directing the gaseous agent liberated from the liquid heat-transfer medium and for discharging it from the liquid heat-transfer medium at the zones of liberation thereof arranged at different height of said channels, and with a device for discharging the gaseous agent from said channels for passing the liquid heat-transfer medium therethrough.

It is expedient to make the plate heat exchanger with stacks of heat-exchanging plates forming heat-exchanging sections positioned one under the other with free space left therebetween.

It is also advisable that in the heat plate exchanger the heat-exchanging sections should be offset with respect to one another so that channels for passing a gaseous heat-transfer medium of one section be aligned with channels for passing a liquid heat-transfer medium of another section.

In the heat exchanger of the above-mentioned type, the heat exchanging plate at the side forming channels for passing the liquid heat-transfer medium is provided with devices determining flow direction of the gaseous agent liberated from the liquid heat-transfer medium and promoting discharging thereof from differing in height channel zones of its liberation from the liquid heat transfer medium. It is expedient to make these devices in the form of partitions, whereas the device for discharging the gaseous agent from the channels for passing the liquid heat-transfer medium should take the form of at least one union connecting two adjacent channels for passing the liquid heat-transfer medium.

It is preferable that said partitions are made with horizontal and vertical portions, whereas the vertical portions are arranged to form passages for the gaseous agent.

It is also possible, according to the invention, to make the partitions as vertically arranged left-hand and right-hand rakes with a passage for the gaseous agent arranged between the bases of said rakes.

In case the partitions are made to include only horizontal portions, it is desirable to provide ports for drawing the gaseous agent off the channel for passing the liquid heat-transfer medium, said ports being disposed below the horizontal portions.

To intensify distillation of a gaseous agent off the liquid heat-transfer medium and to increase the rate of such a distillation, devices providing external flow of the liquid heat-transfer medium and interconnecting adjacent heat-exchanging sections each may have a form of a vertical chamber supplied with bubbling elements, whereas a union is provided in the low portion of the chamber for additional supply of the gaseous heat-exchange medium, and a union for gas discharge is arranged in the upper portion of the chamber. Said bubbling elements may comprise contact mass-exchange elements such as perforated horizontal plates.

In order that the invention may be more clearly understood a specific embodiment thereof will now be described with reference to the accompanying drawings, wherein.

Figure 1:
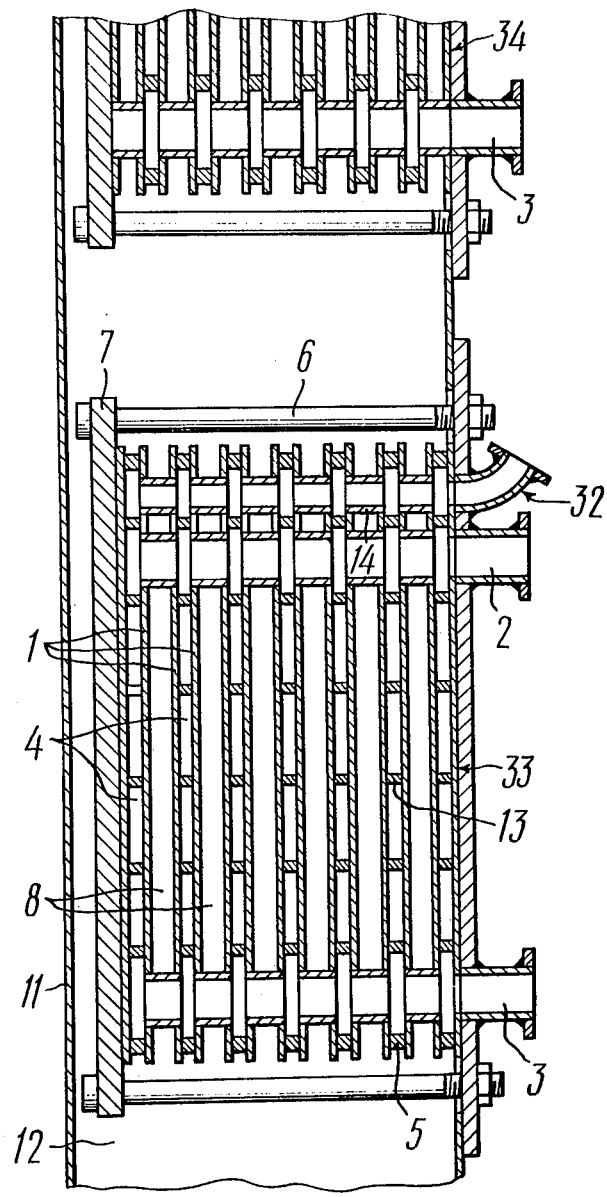
FIG. 1 is a longitudinal sectional view of a plate heat exchanger according to the invention.

A plate heat exchanger comprises stacked heat-exchanging plates 1 (FIG. 1) interconnected at the top in pairs by means of a manifold 2 for introducing a liquid heat-transfer medium and at the bottom by means of a manifold 3 for discharging the liquid heat-transfer medium.

The heat-exchanging plates 1 connected in pairs are arranged to form channels 4 for passing the liquid heat-transfer medium. Each channel 4 for passing the liquid heat-transfer medium between the heat-exchanging plates 1 is provided with peripheral sealing partitions 5 made of chemically stable material. The plates are tightened in stacks by rods 6 and strips 7. Each pair of interconnected plates 1 is adapted to arrange in combination with an adjacent pair of plates a channel 8 for passing a gaseous heat-transfer medium.

Each heat-exchanging plate 1 (FIG. 2) has a port 9 for introducing the liquid heat-transfer medium and a port 10 for discharging thereof.

The stacks of the heat-exchanging plates 1 (FIG. 1) are placed in a housing 11 the interior 12 of which is in direct communication with the channels 8 for passing the gaseous heat-transfer medium.

A gaseous heat-transfer medium inlet pipe (not shown in the drawings) terminates in the interior 12 of the housing 11.

Each heat-exchanging plate at the side forming the channels for passing the liquid heat-transfer medium is provided with devices determining the required flow direction of a gaseous agent liberated from the liquid heat-transfer medium and for discharging it from the zones of its liberation located at different heights of channels 4, said devices being made as partitions 13 pressed out in the body of the plate 1. The device for discharging said gaseous agent from the channel 4 has a form of a union 14 interconnecting the adjacent channels for passing the liquid heat-transfer medium.

The partitions 13 on the heat-exchanging plate 1 (FIG. 2) have horizontal portions 15 and vertical portions 16 and are arranged on the plate 1 in groups on the left and on the right sides so that the horizontal portions 15 (FIG. 2) of the partitions 13 in the left-hand and right-hand groups are alternating within the height of the channel 4 for passing the liquid heat-transfer medium. The vertical portions 16 of the partitions 13 in each of the above-mentioned groups are adapted to form passages for the gaseous agent liberated from the liquid heat-transfer medium. Passages for the liquid heat-transfer medium are arranged between the alternating horizontal sections 15 of the partitions 13 in the left-hand and in the right-hand groups thereof. The flow direction of the liquid heat-transfer medium is indicated by arrows 17.

There is a port 18 for discharging the gaseous agent from the channel 4, said port being in the top portion of the plate 1. Arrows 19 (FIG. 2) indicate the flow direction of the gaseous agent liberated from the liquid heat-transfer medium.

In another structural embodiment of the heat-exchanging plate 1 (FIG. 3) the partitions are made as vertically arranged right-hand and left-hand rakes 20, a central passage 21 for the gaseous agent being arranged between the bases of said rakes.

In this case a port 22 for discharging the gaseous agent is separated from a port 23 for introducing the liquid heat transfer medium by means of a partition 24, whereas a partition 26 is provided above a port 25 for discharging the liquid heat-transfer medium.

Apart from the central passage 21 for the gaseous agent formed by the bases of the rakes 20, the vertical portions of partitions 27 are adapted to form peripheral passages for the gaseous agent.

Figure 4:
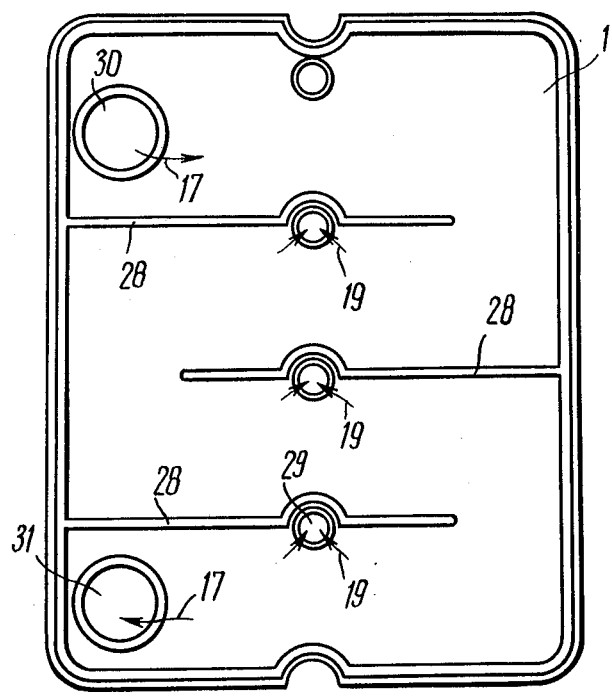
FIG. 4 is one more embodiment of a heat-exchanging plate.

FIG. 4 shows a structural embodiment of a heat-exchanging plate wherein all partitions are arranged horizontally. In this case horizontal partitions 28 alternately form passages on the right and on the left for the liquid heat-transfer medium and at the same time they serve to direct the gaseous agent liberated from zones having different height along the channel 4 (FIG. 1) to ports 29 (FIG. 4) which are used for discharging said gaseous agent from the channel for which purpose the partitions are curved above the ports 29.

A port 30 for introducing the liquid heat-transfer medium and a port 31 for its discharging are located in the top and bottom portions of the plate respectively.

An output of the gaseous heat-transfer medium (not shown in the drawings) is provided in the upper portion of the housing.

In all the above embodiments of the heat-exchanging plates 1 a device for discharging the gaseous agent from the channels 4 for passing heat-transfer medium comprises at least one union 14 connecting the ports for discharging the gaseous agent from the channel for passing the liquid heat-transfer medium, said ports being made in the heat-exchanging plates isolating the adjacent channels for passing the liquid heattransfer medium.

The unions 14 leading from each channel 4 and provided for passing the liquid heat-transfer medium, as shown in FIG. 1, come through the channels 8 for passing the gaseous heattransfer medium to form a common offtake duct 32.

In all the above-described embodiments of the partitions in the channels for passing the liquid heat-transfer medium, said partitions may be constructed in different ways. For example, they may be stamped out directly in the heat-exchanging plates, or may comprise partitions specially installed in the channels for passing the liquid heat-transfer medium, said partitions being made of suitable resilient materials, or metal and the like.

A plate heat exchanger comprises sections 33, 34 (FIG. 1) of heat-exchanging plates 1 arranged one above the other with free space 12 left between the sections. It is quite obvious that more than two such sections (FIG. 1) may be provided. The heat-exchanging sections 33 and 34 are offset with respect to each other in a lateral direction so that the channels 8 for passing the gaseous heat-transfer medium of the section 33 are found just against the channels 4 for passing the liquid heat-transfer medium of the other section 34.

Figure 5:
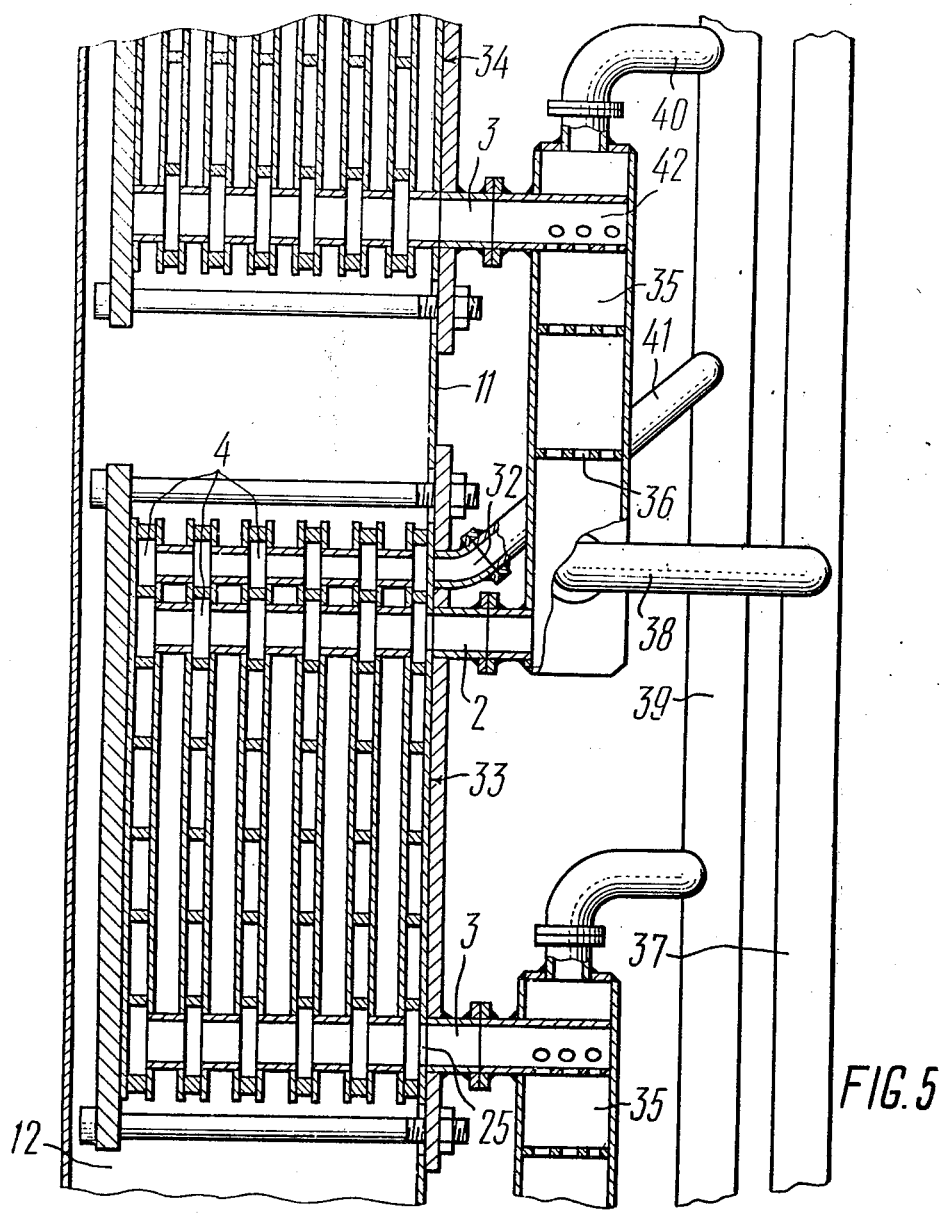
FIG. 5 is a view showing a plate heat exchanger provided with means for external passing of a liquid heat-transfer medium equipped with bubbling elements.

A heat exchanger shown in FIG. 5 is provided with devices for external flow of a liquid heat-transfer medium between the heat-exchanging sections 34 and 33. In the specific embodiment shown in the drawing this device comprises a vertical chamber 35 with two bubbling elements 36 (FIGS. 6 and 7) inside this chamber, said elements being made in the form of a mass-exchanging element, such as a horizontal perforated plate. A number of such vertical chambers 35 may be provided depending on the number of heat-exchanging sections 33, 34 (FIG. 5). In the latter case they have a common manifold 37 for introducing the gaseous heat-transfer medium into the vertical chambers 35.

The manifold 37 may be connected either to the interior 12 of the housing 11 under the lowest heat-exchanging section 33, or to the pipe adapted to feed the gaseous heat-transfer medium into this interior. (said pipe is not shown in the drawings).

Unions 38 are intended for introducing the gaseous heattransfer medium into the low portion of the vertical chambers 35. A union 39 is used for discharging gaseous components from the upper portion of the vertical chambers 35 through unions 40 and at the same time it is adapted for discharging the gaseous agent liberated from the liquid heat-transfer medium in the sections 33 and 34 by means of gas offtakes 32 connected to the manifold 39 through a pipe 41.

The introduction of the liquid heat-transfer medium from the top heat-exchanging section 34 to the vertical chamber 35 is carried out through the manifold 3.

To ensure more uniform distribution of the liquid heattransfer medium over the surface of the element 36, a perforated tube 42 connected to the manifold 3 may be disposed above this element.

A plate heat exchanger constructed according to the present invention operates as follows.

A liquid heat-transfer medium, such as the filter liquid used in soda ash production containing carbon dioxide together with other components, is delivered through the manifold 2 to the channels 4 for passing the liquid heattransfer medium.

A gaseous heat-transfer medium, such as steam or steamgas mixture, is delivered from the interior 12 of the housing 11 to the channels 8 for passing the gaseous heat-transfer medium. The heat-exchange process is effected through the thin-walled heat-exchanging plates 1. The above-mentioned partitions 13 made on the plates contribute to increasing the stay period of the heat-exchanging liquid and the speed of its flow.

The liquid heat-transfer medium flowing through the channel 4 to the lower portion of each section of the heat exchanger is discharged from this section via the manifold 3 and through the device for external flowing it is delivered to the manifold 2 of the below disposed heat-exchanging section 33.

The gaseous heat-transfer medium containing drops of a condensate flows upwards along the channels 8 and enters the interior space 12 between the sections 33 and 34.

In this interior space the drops of a condensate lose their speed and upon striking against the end face of the channel 4 in the top section 34, said channel being opposed to the channel 8 of the bottom section 33, flow down towards the walls of the heat exchanger, while the gaseous heat-transfer medium is directed to the channels 8 of the top section 34 for heat exchange through the agency of the heat-exchanging plates 1 with the liquid heat-transfer medium delivered to the top section 34.

During the heat exchange process, the heat-transfer liquid liberates a gaseous agent discharged from the channels 4 via the unions 14 and the common gas offtake 32.

The flow pattern of the liquid and the gaseous agent liberated therefrom in the channel 4 may differ depending on the shape of the plate 1 and the shape of the partitions 13.

Figure 2:
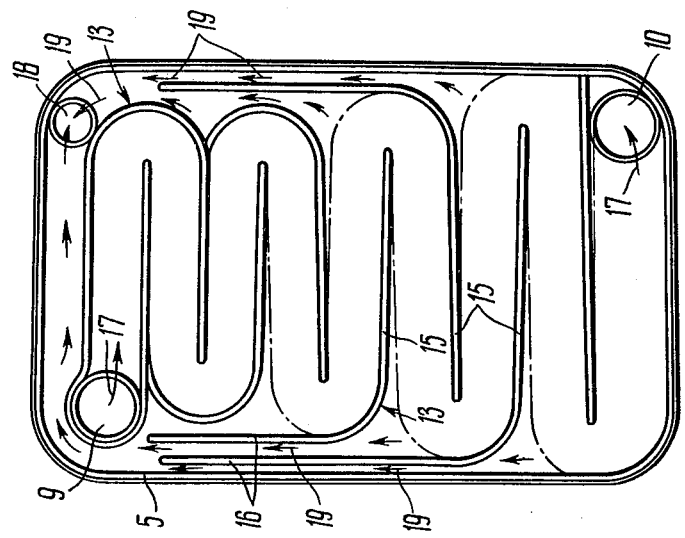
FIG. 2 is a schematic view along arrow A of a heat-exchanging plate according to the invention.

When the heat-exchanging plate and the partitions are made with horizontal and vertical portions, as shown in FIG. 2, the liquid heat transfer medium enters the channels 4 via the port 9 in the heat-exchanging plate and flows downwards over the horizontal portions 15 of the partitions 13. The gaseous agent liberated at heating the liquid heat-transfer medium is collected, due to the horizontal sections 15 of the partitions 13 disposed in the zones of the channel differing in height, above said sections 15, and obtains, due to the provisions of the vertical sections 16 of the partitions 13, a required flow direction in the passages formed by these partitions towards the port 18 provided in the heat-exchanging plate wherethrough the gaseous agent is discharged from the channel 4 for passing the liquid heat-transfer medium.

Figure 3:
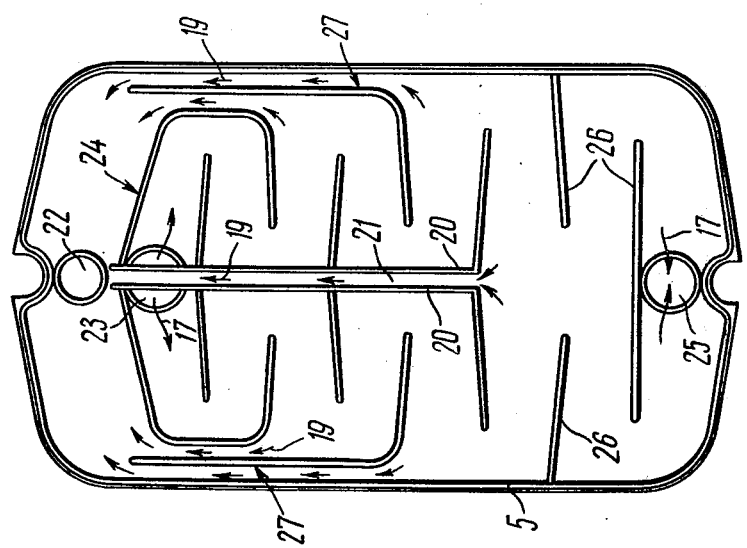
FIG. 3 is another embodiment of a heat-exchanging plate.

When a part of the heat-exchanging plates is made as vertically arranged rakes (as shown in FIG. 3), the liquid heat-transfer medium enters the channel 4 to be uniformly distributed due to the rakes 20 on the right and left sides of the central passage 21 for the gaseous agent formed by the bases of the rakes 20.

Owing to the rakes 20 and the horizontal portions of the partitions 27, the liquid heat-transfer medium is uniformly distributed over the heat-exchanging plate. The gaseous agent liberated from said medium in heating is collected under the horizontal portions of the partitions 27 in the zones of the channel disposed at different height. Then the gaseous agent is directed to the port 22 for discharging from the channel 4 via the peripheral passages formed by the vertical partitions 27 and via the central passage 21 formed by the bases of the rakes 20.

Upon completion of heat exchange the liquid heat-transfer medium flows down the partition to be discharged via the port 25 provided in the heat-exchanging plate.

When all partitions in the channel for passing the liquid heat-transfer medium are made horizontal (FIG. 4), this medium enters said channel via the port 30 in the heat-exchanging plate and flows down the horizontal partitions 28 in a zigzag pattern. The gaseous agent liberated from the liquid heat-transfer medium at heating is accumulated under the partitions 28 in the zones of the channel disposed at different height and discharged from the channel to the ports 29 located below the horizontal partitions 28, while the liquid heat-transfer medium is discharged from the channel via the port 31. It is apparent that the invention is not limited to the disclosed embodiment as it is obvious that the partitions may be made in other shapes and forms provided they are adapted to ensure passages for the gaseous agent liberated from the liquid heat-transfer medium with subsequent discharging this agent from the zones disposed at different height of the heat-exchanging plate. Thus, for example, the vertical portions of the partitions may be somewhat curved.

Figure 6:
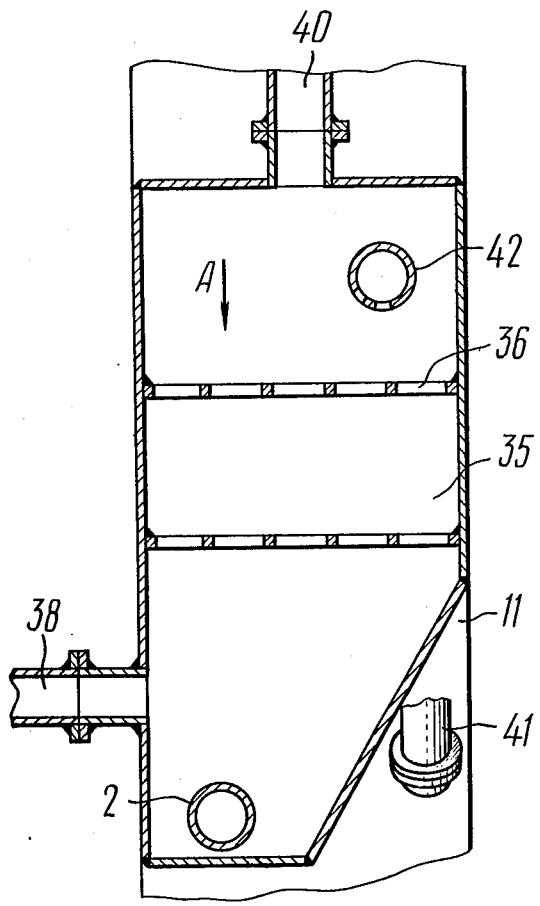
FIG. 6 is a longitudinal sectional view of means for external passing of a liquid heat-transfer medium.
Figure 7:
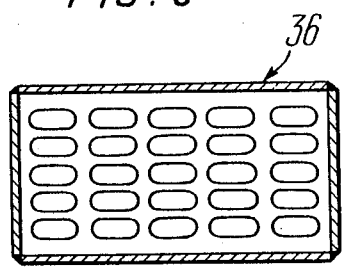
FIG. 7 is a view along arrow A of a bubbling element provided in the means for external passing of a liquid heat-transfer medium.

In embodiment of the heat exchanger equipped with the vertical chambers 35 having bubbling elements 36, as it is shown in FIGS. 5, 6 and 7, the flows of the liquid heat-transfer medium and the gaseous agent liberated therefrom occur in the channels 4 in the same way as in above-described embodiment and depend on the specific form and arrangement of the partitions 13 to be used. The effect of liberation and distillation of the gaseous agent from the liquid heat-transfer medium may be further increased by the use of the device for external flow of the liquid heat-transfer medium, said device comprising the vertical chambers 35 with the bubbling elements 36.

In this case upon completion of the heat-exchanging process in the channels 4 of the upper heat-exchanging section 34, the liquid heat-transfer medium flows by gravity via the discharging port 25 provided in the lower portion of the heat-exchanging plate 1, through the manifold 3 and the perforated tube 42 to the upper portion of the vertical chamber 35 and then to the bubbling element 36. At the same time the gaseous heat-transfer medium enters the lower portion of the vertical chamber 35 via the union 38 from the common manifold 37.

The counterflow conditions of the liquid and gaseous heat-transfer media and direct contact therebetween on the bubbling elements 36 in the chambers 35 contribute to the liberation of some additional quantity of the gaseous agent from the liquid heat-transfer medium, said liberation of the gaseous agent being made under the conditions of intensive distillation and blowing thereof from the liquid heat-transfer medium having been heated in the channels 4 of the heat-exchanging section 34.

The process is most effective in case of using contact elements in the form of perforated plates.

The gaseous agent additionally liberated from the liquid heat-transfer medium in the vertical chamber 35 is removed from the upper portion of said chamber via the union 40 to the manifold 39 with simultaneous admission to this manifold via the gas offtake 32 and the pipe 41 of a portion of the gaseous agent liberated from the liquid heat-transfer medium in the channel 4 of the heat-exchange section 33.

Having passed the vertical chamber 35, the liquid heat-transfer medium flows by gravity via the manifold 2 to the channels 4 of the heat-exchanging section 33 for the subsequent treatment.

In a like manner the process is carried out in the other vertical chambers 35.

Thus, a plate heat exchanger according to the invention allows it for the first time to be employed in such chemical and petrochemical processes, for example in the ammonia soda process, in which hitherto only tubular heat exchangers of much lower efficiency have been traditionally used through decades.

What is claimed is:

1. A plate heat exchanger for heat exchange between a gaseous heat-transfer medium and a liquid heat-transfer medium which liberates a gas that rises through the liquid in the form of bubbles during the heat exchange process, comprising:
   a. at least two superimposed stacks of parallel, vertically disposed heat-exchanging plates;
   b. peripheral sealing means for sealing together alternate pairs of plates within each said stack to form chambers adapted therein to direct the flow of the gas-liberating liquid heat-transfer medium, each pair of alternate pairs of thus sealed plates defining therebetween a channel for the passage of a gaseous heat-transfer medium;
   c. means for separately feeding the liquid heat-transfer medium into the upper portion of each of said chambers;
   d. means for separately discharging the liquid heat-transfer medium from the lower portion of each of said chambers;
   e. exhaust conduits connected to said chambers for discharging the gas which has been liberated from the liquid heat-transfer medium therein;
   f. partitions within each of said chambers carried by one of the plates forming the respective chambers for directing the liberated gas therein to the exhaust conduit therefor, said partitions being so positioned that the rising bubbles of gas are directed away from the downward flow of the liquid heat-transfer medium whereby intermixing of the gas with the liquid heat-transfer medium is prevented; and
   g. a hollow housing containing said stacked plates therein, the interior of said housing being in direct communication with said channels for unidirectional straight-through passage of the gaseous heat-transfer medium through said channels.

2. A plate heat exchanger according to claim 1, wherein said stacks of plates are arranged one above the other with free space therebetween, said stacks being interconnected by devices for external flow of the liquid heat-transfer medium.

3. A plate heat exchanger according to claim 2, wherein the device for external flow of the liquid heat-transfer medium comprises at least one vertical chamber with bubbling elements arranged therein, the lower portion of the vertical chamber being provided with means for introducing the gaseous heat-transfer medium the upper portion of said vertical chamber being provided with means for discharge of the gas.

4. A plate heat exchanger according to claim 1, wherein the heat-exchanging stacks are superposed and are offset with respect to one another so that the channels for passing the gaseous heat-transfer medium of one stack are located opposite the channels for passing the liquid heat-transfer medium of the next adjacent stack.

5. A plate heat exchanger according to claim 1, wherein said partitions have horizontal and vertical portions, the vertical portions of said partitions forming passages for the evolved gases.

6. A plate heat exchanger according to claim 1, wherein a part of the partitions is made as vertically arranged right-hand and left-hand rakes with a passage formed between the bases of said rakes for bubbles of the evolved gas.

7. A plate heat exchanger according to claim 1, wherein the partitions are made horizontal with ports provided therebelow in the heat-exchanging plate for discharging the bubbles of the gas being evolved from the channels for passing the liquid heat-transfer medium.

* * * * *